United States Patent [19]

Spain

[11] Patent Number: 5,001,961
[45] Date of Patent: Mar. 26, 1991

[54] BRAIDED PREFORM

[75] Inventor: Raymond G. Spain, Farmington Hills, Mich.

[73] Assignee: Airfoil Textron Inc., Lima, Ohio

[21] Appl. No.: 442,567

[22] Filed: Nov. 29, 1989

Related U.S. Application Data

[60] Division of Ser. No. 192,157, May 10, 1988, Pat. No. 4,916,997, which is a continuation-in-part of Ser. No. 191,435, May 9, 1988, abandoned.

[51] Int. Cl.[5] .................... D06P 7/00; D04C 1/00
[52] U.S. Cl. ............................................. 87/1; 87/8
[58] Field of Search ........................... 87/1, 5-9, 87/23, 28-30, 33, 34

[56] References Cited

U.S. PATENT DOCUMENTS

| | | | |
|---|---|---|---|
| 3,426,804 | 2/1969 | Bluck | 87/33 X |
| 3,620,280 | 11/1971 | Marzocchi | 57/229 X |
| 4,211,818 | 7/1980 | Ackley | 428/367 |
| 4,539,249 | 9/1985 | Curzio | 428/175 |
| 4,581,053 | 4/1986 | Prewo et al. | 65/4.21 |
| 4,613,473 | 9/1986 | Layden et al. | 264/103 |
| 4,626,461 | 12/1986 | Prewo et al. | 428/113 |
| 4,664,731 | 5/1987 | Layden et al. | 156/89 |
| 4,690,851 | 9/1987 | Auduc et al. | 428/116 |
| 4,719,837 | 1/1988 | McConnell et al. | 87/1 |

OTHER PUBLICATIONS

Frank Ko, Ping Fang and Helen Chu, 3-D Braided Commingled Carbon Fiber/PEEK Composites, Mar. 7-10, 1988, presented at 33rd International SAMPE Symposium.

*Primary Examiner*—Stanley N. Gilreath
*Attorney, Agent, or Firm*—Reising, Ethington, Barnard, Perry & Milton

[57] ABSTRACT

The method involves braiding a plurality of fiber bundles, each comprising a reinforcing fiber overwrapped by a plurality of glass or metal matrix-forming fibers, to form a 3D braided preform having stuffer fiber bundles extending longitudinally therethrough and heating the preform at a temperature and applying pressure to form the matrix-forming fibers into a bonded matrix in which the reinforcing fibers are disposed in a 3D braided pattern and in a longitudinal (stuffer) pattern.

5 Claims, 2 Drawing Sheets

BRAIDED PREFORM

This application is a division of application Ser. No. 192,157 filed May 10, 1988, now U.S. Pat. No. 4,916,997, which is a continuation-in-part of application Ser. No. 191,435 filed May 9, 1988, now abandoned.

FIELD OF THE INVENTION

The invention relates to composite articles having a matrix with reinforcing fibers disposed therein and, in particular, to composite articles having a matrix reinforced by a three dimensional fiber preform and to methods for their manufacture.

BACKGROUND OF THE INVENTION

It is known to form composite articles having a glass matrix with a plurality of reinforcing fibers, such as silicon carbide and the like.

Illustrative of some techniques used in the past to make such composite articles is U.S. Pat. No. 4,581,053 which discloses coating a silicon carbide fiber with glass powder, weaving the coated fiber into an article shape and then hot pressing the shape to form a composite article having a glass matrix with silicon carbide reinforcing fibers therein.

U.S. Pat. No. 4,613,473 involves weaving or knitting cloth from yarn made of a matrix material such as glass, ceramic and the like, weaving or knitting cloth from yarn of a reinforcing fiber, interleaving the cloths to form a preform, stacking the preforms, and hot pressing the stack in a die to densify the preforms into a near net shape article having a matrix of the matrix material (glass, ceramic and the like) reinforced by the reinforcing fibers.

U.S. Pat. No. 4,626,461 describes gas turbine engine components of complex shape, such as airfoil blades and vanes, having a ceramic or glass matrix reinforced with silicon carbide fibers.

U.S. Pat. No. 4,664,731 illustrates making a fiber reinforced glass composite using glass frit impregnated preforms and passing the preform through a pultrusion apparatus.

Other known processes for making similar composite articles involve coating the reinforcing fibers with a glass slurry or frit and then laying up the coated fibers for subsequent hot processing to provide a densified fiber reinforced glass matrix composite article.

Composite articles having a thermo-set plastic matrix reinforced by fibers have been made by different methods. For example, U.S. Pat. No. 4,211,818 discloses formation of composite strands of resin, at least one carbon fiber and a plurality of glass fibers by passing the carbon fibers and glass fibers through a resin bath and then a die. The composite strands exiting from the resin bath are wound on a mandrel to form a preform. Polyethelyene sheets are placed on opposite sides of the preform. When hot pressed, the preform is formed into an article having a thermo-set plastic matrix with carbon and glass reinforcing fibers therein.

U.S. Pat. No. 4,539,249 provides a yarn comprising thermoplastic fibers blended with graphite, glass and other like reinforcing fibers. The blended yarn is woven into a soft, supple and flexible fabric which is shaped in a mold and heated to melt the resin to produce a resin matrix reinforced by the reinforcing fibers.

U.S. Pat. No. 4,690,851 discloses a fabric woven from textured glass fibers and carbon fibers. The fabric is impregnated with resin and then heated to form a fire resistant, light weight composite article.

SUMMARY OF THE INVENTION

The invention contemplates a method for making a composite article including arranging a plurality of braiding fiber bundles and stuffer fiber bundles, each bundle comprising a reinforcing fiber overwrapped by a plurality of matrix-forming fibers, to extend from a braiding device, moving the braiding fiber bundles in a braiding pattern to intertwine them with one another and with the stuffer fiber bundles to form a braided preform, and subjecting the braided preform to a temperature and pressure sufficient to form the matrix-forming fibers into a bonded matrix in which the reinforcing fibers are disposed. The reinforcing fibers are disposed in the matrix in a braided pattern and a longitudinal (stuffer) pattern.

The invention also contemplates a method for making a composite article comprising braiding a plurality of fiber bundles, each bundle including a reinforcing fiber overwrapped by a plurality of glass matrix-forming fibers, to form a braided preform and heating the braided preform to at least the softening temperature of the glass matrix-forming fibers and applying pressure to the preform to form a glass matrix in which the reinforcing strands are disposed in a 3D braided pattern.

In a preferred embodiment of the invention, a plurality of high softening temperature silica matrix-forming fibers and a plurality of lower softening temperature glass matrix-forming fibers are overwrapped about each reinforcing fiber. After braiding, the resulting preform is heated to at least the softening temperature of the glass fibers to form the matrix-forming fibers into a matrix with the reinforcing fibers disposed therein in a 3D braided pattern.

The invention also contemplates a method for making a composite article comprising braiding a plurality of fiber bundles, each comprising a reinforcing fiber overwrapped by a plurality of metal matrix-forming fibers, to form a braided preform. The braided preform is heated to an elevated temperature and pressure is applied to bond the metal matrix-forming fibers into a metal matrix in which the reinforcing fibers are disposed in a 3D braided pattern.

In one embodiment of the invention, the metal matrix-forming fibers include aluminum, copper, nickel, cobalt or iron base superalloys and the like.

In another embodiment of the invention, the braided preform is heated to a temperature and under pressure to diffusion bond the metal matrix-forming fibers into a bonded metal matrix.

A novel braided preform of the invention is also disclosed.

BEST MODE FOR PRACTICING THE INVENTION

Figure 1:
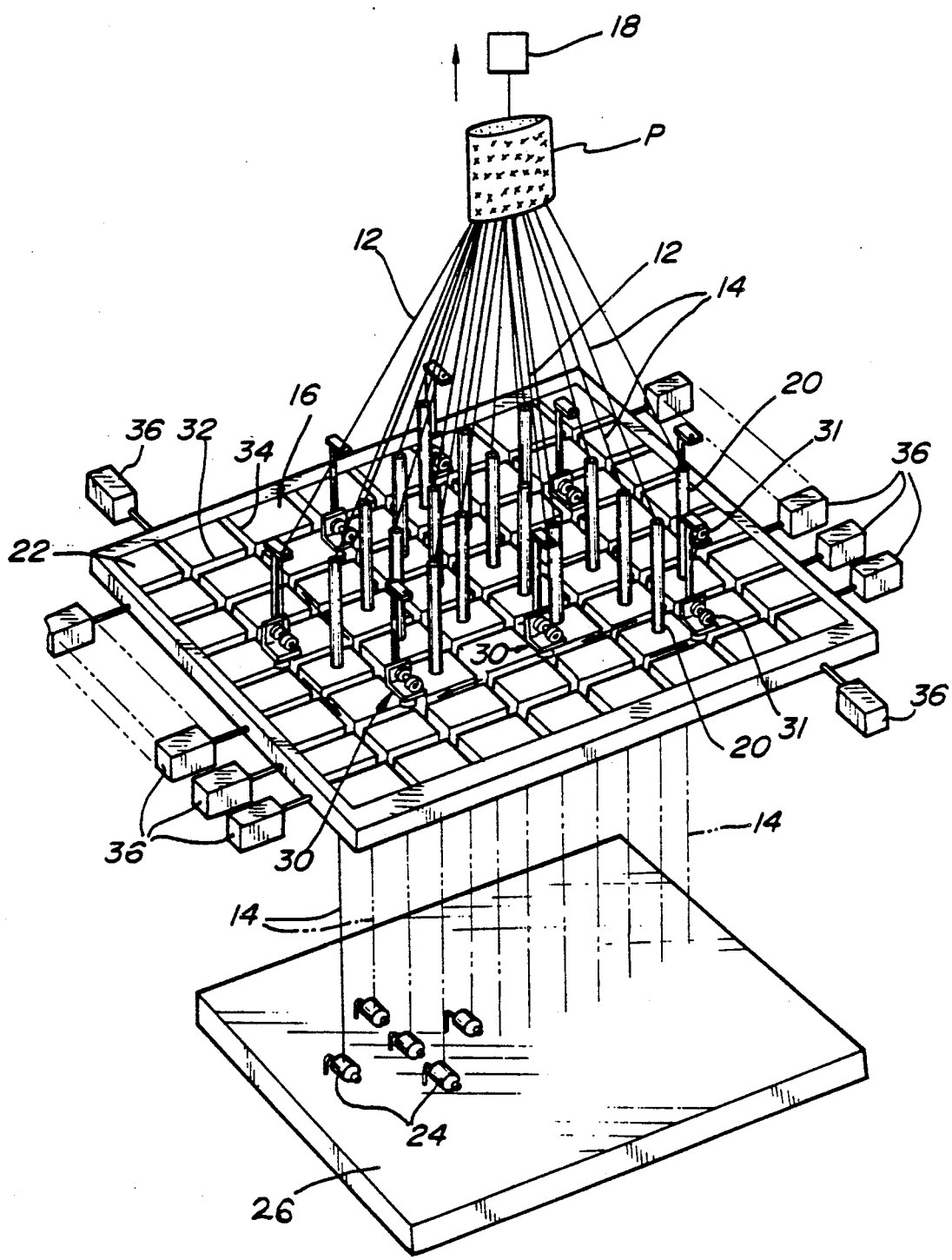
FIG. 1 is a schematic diagrammatic view of a braiding apparatus for practicing the invention.

The method of the invention can be practiced on a braiding device 10 such as that schematically shown in FIG. 1 wherein braiding fiber bundles 12 and axial stuffer fiber bundles 14 extend from a braiding surface 16 toward a puller or take-up mechanism 18 located above the braiding surface 16. The braiding fiber bundles 12 are moved in a braiding pattern across the braiding surface 16 to intertwine or interlace with one another and with the axial stuffer fiber bundles 14 which either remain in fixed position, FIG. 1, on the braiding surface 16 or are moved in opposite parallel directions thereon while the braiding fiber bundles 12 are moved in the desired braiding pattern.

The braiding apparatus 10 of FIG. 1 includes a plurality of axial stuffer fiber guide tubes 20 and an X-Y grid support 22. An axial stuffer fiber bundle 14 is fed to each guide tube 20 from a spool or supply 24 disposed on a lower support 26 located beneath the grid support 22.

A plurality of braiding fiber carriers 30 are disposed in grooves 32,34 of the grid support 22 for movement in the X and Y directions by means of actuators 36 (shown schematically) such as fluid cylinders, solenoids and the like. The carriers 30 are moved by the actuators 36 in a braiding pattern to interlace the braiding fiber bundles 12 with one another and with the fixed axial stuffer fiber bundles 14 to form a 3D braided preform P which is removed by the puller or take-off mechanism 18. Each braiding fiber bundle 12 is dispensed from a spool or supply 31 on each carrier 30. The 3D braided preform P is illustrated as having an untwisted airfoil shape but myriad other preform shapes can be braided in accordance with the method of the invention. The carriers 30 can be moved in various braiding patterns to this end as taught in the Bluck U.S. Pat. No. 3,426,804 and the McConnel and Popper U.S. Pat. No. 4,719,837, as those skilled in the art will appreciate. Only some actuators 36 are shown in FIG. 1 for convenience. Those skilled in the art will appreciate that an actuator 36 is associated with each row and column of the grid support 22 at opposite ends of each row and column.

A preferred braiding apparatus for practicing the method of the invention is described in copending U.S. patent application Ser. No. 191,434 filed May 9, 1988, now U.S. Pat. No. 4,922,798, entitled "Apparatus And Method For Braiding Fiber Strands" filed in the names of Thomas J. Ivsan, Carlos Bailey and Llewell Jessup as joint inventors and of common assignee herewith.

Figure 2:
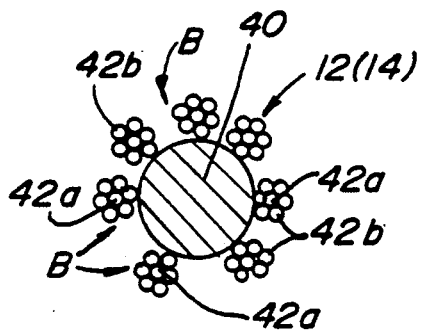
FIG. 2 is a schematic cross-sectional view through a fiber bundle showing a reinforcing fiber overwrapped by a plurality of twisted matrix-forming fibers.
Figure 5:
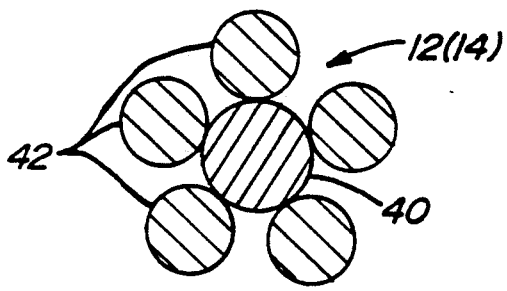
FIG. 5 is similar to FIG. 2 showing a reinforcing fiber overwrapped by a plurality of twisted metal matrix-forming fibers.

In a preferred mode of practicing the method of the invention, each braiding fiber bundle 12 and each axial stuffer fiber bundle 14 are the same and each fiber bundles 12,14 comprises one or more reinforcing fibers (or strands) 40 and a plurality of matrix-forming fibers 42 overwrapped about each reinforcing fiber 40, FIGS. 2 and 5. The type of reinforcing fiber 40 will vary with the type of matrix-forming fibers to be used, the requirements of the composite article and other factors. The same applies to the matrix-forming fibers 42 wrapped about the reinforcing fiber 40.

Figure 3:
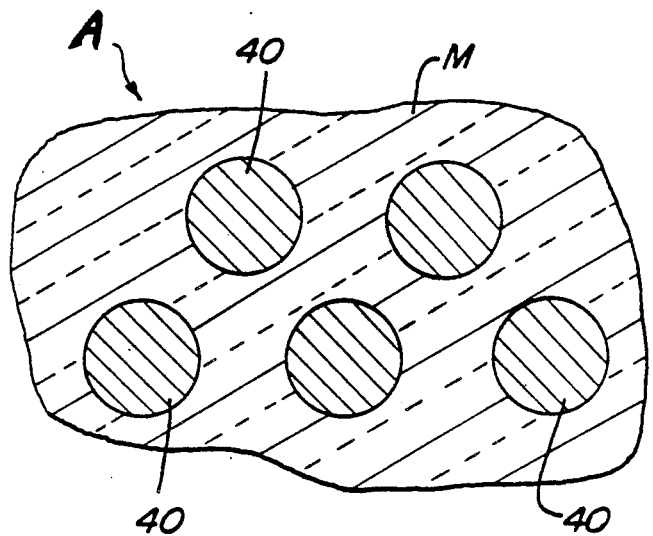
FIG. 3 is a fragmentary schematic cross-sectional view of a composite article made by the method of the invention showing only the stuffer reinforcing fibers in the matrix for convenience.

A first embodiment of the invention will be illustrated using fiber bundles 12,14 having a plurality of tungsten or tungsten alloy (W-Rh alloy) metal reinforcing fibers 40 each overwrapped by a plurality of continuous, low softening temperature glass fibers 42a and a plurality of continuous, high softening temperature silica fibers 42b, FIG. 2. The fiber bundles 12,14 are prepared using 4 mil and/or 6 mil diameter tungsten strands 40 (or other refractory metal or refractory metal alloy strand) each of which is overwrapped with the glass fibers 42a and silica fibers 42b in desired ratio (e.g., volume percent) of glass fibers to silica fibers to provide a desired glass matrix in the final composite article A, FIG. 3. Similarly, the ratio of glass and silica fibers 42a, 42b (their aggregate cross-sectional areas) to the tungsten strands 40 (e.g., the diameter of tungsten strand) in the fiber bundles 12,14 is controlled to provide the desired volume percent of tungsten reinforcing fiber in the fiber bundles and the composite article A; e.g. for purposes of illustration 20 volume percent tungsten reinforcing fibers, 15 volume percent glass matrix fibers and 65 volume percent silica matrix fibers.

Typically, the glass/silica fibers 42a, 42b are provided in discrete bundles B of mixed fibers with the glass fiber 42a in the center of the silica fibers 42b. The glass/silica bundles B are overwrapped on each tungsten reinforcing strand 40 by twisting the glass/silica fiber bundles B about the outer periphery of the tungsten fiber 40 on a known fiber twisting device (not shown). The braiding fiber bundles 12 and stuffer fiber bundles 14 are thus characterized as having a plurality of tungsten reinforcing strands 40 each overwrapped by the glass/silica fibers 42a, 42b. Some of the glass/silica bundles B in each fiber bundle 12,14 may have a left-hand twist around the associated tungsten fiber 40 while others of the glass/silica bundles B may have a right-hand twist around the associated tungsten fiber 40.

A suitable low softening temperature glass fiber for use in the invention is available as E-glass fiber from Owens-Corning Fiberglass Corp. Suitable higher softening temperature glass fibers are also available from the same source as S-glass and S2-glass. Astroquartz ® silica fiber having a much higher softening temperature is available from N. P. Stevens & Co., Inc. In particular, E-glass fiber is a glass fiber having a softening point in the range of about 1350° F. to 1610° F. and S-glass/S2-glass fibers are glass fibers having a softening point in the range of about 1560° F. and 1778° F. Astroquartz silica fiber has a softening temperature of about 3000° F. The use of S-glass, S2-glass and/or Astroquartz silica with E-glass provides a glass matrix in the composite article A having enhanced high temperature properties compared to a composite article having a matrix formed solely of E-glass.

As used herein and in the claims, the term glass fiber or glass matrix shall include glass fibers or matrices, silica fibers or matrices, ceramic fibers or matrices and mixtures thereof.

The fiber bundles 12,14 described hereinabove having the tungsten reinforcing strands 40 each overwrapped by the glass/silica fibers 42a, 42b are arranged on the braiding device 10 to extend away from the braiding surface 16, as shown in FIG. 1, and then the braiding fiber bundles 12 are moved in a selected braiding pattern to intertwine the braiding fiber bundles 12 with one another and with the axial stuffer fiber bundles 14 to form the braided preform P. The braided preform P includes the stuffer fiber bundles 14 extending axially or longitudinally through the braided pattern of the braiding fiber bundles 12.

Following braiding of the preform P having the airfoil cross-section, the preform P is placed in a shaping mold 60 having mold halves 62,64 defining therebetween a mold cavity 66 designed to impart the desired shape to the preform P. The shaping mold 60 with the preform P therein is then sealinqly enclosed in a flexible, gas impermeable container 70, such as a carbon steel container or can, FIG. 4.

The container 70 is then placed in a conventional hot isostatic pressure (HIP) unit 80. The temperature of the preform P is raised to at least, preferably greater than, the softening temperature of the lower softening temperature glass and subjected to elevated pressure such as 15000 psi, for a sufficient time to at least soften the glass/silica fibers 42a, 42b and bond them into a unitary glass matrix M of the composite article A with the tungsten reinforcing fibers 40 present in the unitary matrix M in a braided pattern and longitudinal (axial stuffer) pattern, FIG. 3. For a preform braided of fiber bundles having the mixture of E-glass and Astroquartz fibers described hereinabove, a HIP temperature of 2400° F. and pressure of 15000 psi were acceptable to bond the glass/silica fibers into a unitary matrix. For a preform P braided of fiber bundles 12,14 having the 4 and 6 mil tungsten fibers overwrapped by multiple E-glass fibers, a HIP temperature of 1850° F. and pressure of 15000 psi proved satisfactory to bond the E-glass fibers into a unitary, glass matrix.

A second embodiment of the invention will be illustrated using fiber bundles 12,14 having a non-metallic or metallic reinforcing fiber (strand) 40, such as a graphite, carbon, glass, ceramic, tungsten or other reinforcing fiber, overwrapped by a plurality of metal matrix-forming fibers 42, such as aluminum, copper and nickel, cobalt or iron base superalloys and other metals or alloys. For illustration purposes, each fiber bundle 12,14 may comprise a central tungsten reinforcing fiber 40 having a diameter of about 4 to 6 mils (0.004–0.006 inch) overwrapped by a plurality of Kanthal ® metal fibers 42 (having a diameter of about 5 mils). Some fiber bundles 12,14 can include a 4 mil tungsten reinforcing fiber while others may include a 6 mil tungsten reinforcing fiber. Kanthal metal fibers comprise an alloy of Fe, Cr and Al and have been used as electrical resistance heating wires. Kanthal metal fibers having a diameter of 5 mils are available from Duralite, Inc.

The fiber bundles 12,14 having the reinforcing fiber 40 overwrapped by the plurality of Kanthal metal fibers 42, FIG. 5, are each formed by the twisting technique described hereinabove. The ratio of cross-sectional areas of Kanthal fibers to tungsten fibers was selected to provide a volume percentage of tungsten fiber in the bundle of 30 v/o (volume percent) and the balance of 70 v/o constituted Kanthal fibers.

The fiber bundles 12,14 of tungsten fiber overwrapped by multiple Kanthal fibers are arranged on the braiding apparatus 10 as described hereinabove and the braiding fiber bundles 12 are moved in a braiding pattern to intertwine the braiding fiber bundles 12 with one another and with the axial stuffer fiber bundles 14 to form a similar shaped preform p as shown in FIG. 1. The preform includes the stuffer fiber bundles 14 extending axially through the braided pattern of the braiding fiber bundles 12.

Figure 4:
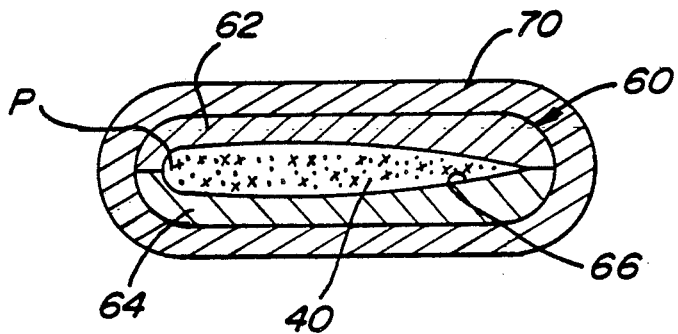
FIG. 4 is a cross-sectional view through a HIP can with a preform thereon.
Figure 6:
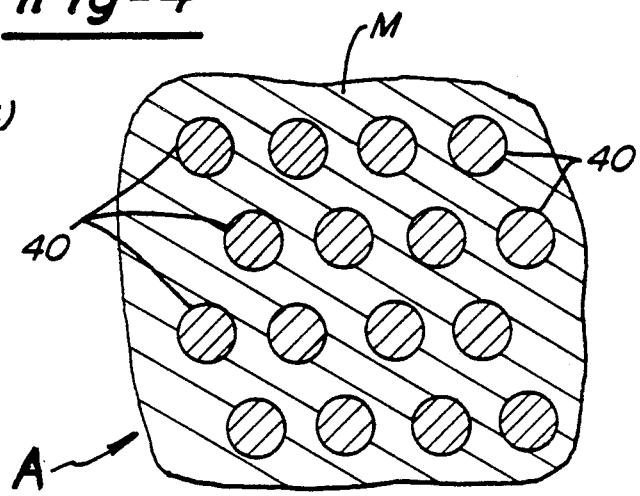
FIG. 6 is a fragmentary schematic cross-sectional view of a metal matrix composite article made by the method of the invention showing only the stuffer reinforcing fibers in the matrix for convenience.

Following braiding, the preform P formed from the tungsten/Kanthal fiber bundles 12,14 is placed in the shaping mold 60 and the mold 60 is sealingly enclosed in a steel can 70, FIG. 4. The preform is HIP'ed in the steel can 70 at a temperature; e.g., 1825° F., and a pressure; e.g., 15000 psi, for a sufficient time to diffusion bond the Kanthal fibers 42 into a bonded, unitary metal matrix M of the composite article A with the tungsten fibers 40 extending through the metal matrix M in a braided pattern and axial stuffer pattern; e.g., see FIG. 6 which shows the Kanthal metal matrix M with the tungsten fibers 42 therein.

In the embodiments described in detail hereinabove, the fiber bundles 12,14 comprise one or more reinforcing fibers 40 each overwrapped and surrounded by a plurality of the matrix-forming fibers 42. Use of such a fiber bundle construction prevents the rernforcing fibers 40 from contacting one another in the preform P during HIP'ing and in the composite article A to enhance the strength of the composite article.

Although the invention has been described hereinabove with respect to HIP'ing of the braided preform P to form the matrix-forming fibers 42 into a bonded, unitary matrix in which the reinforcing fibers 40 are disposed, other hot pressing techniques known to those skilled in the art may be used.

Also, in FIG. 1, the axial stuffer fiber bundles 14 are illustrated as remaining in fixed or stationary positions on the grid support 30 while the braiding fiber bundles 12 are moved in the braiding pattern to intertwine the braiding fiber bundles with one another and with the stuffer fiber bundles. The invention is not so limited and preferably includes moving the axial stuffer fiber bundles 14 in opposite parallel directions as the braiding fiber bundles 14 are moved in the braiding pattern. Copending U.S. patent application Ser. No. 191,564 filed May 9, 1988 entitled "Apparatus And Method For Braiding Fiber Strands And Stuffer Fiber Strands" filed in the names of Raymond G. Spain and Carlos Bailey, of common assignee herewith, describe a braiding apparatus to effect such limited movement of the stuffer fiber bundles.

While the invention has been described in terms of specific preferred embodiments thereof, it is not intended to be limited thereto but rather only to the extent set forth hereafter in the following claims.

I claim:

1. A braided preform comprising a braided pattern of fiber bundles, each comprising a reinforcing fiber overwrapped by a plurality of matrix-forming fibers, said braided pattern having stuffer fiber bundles, each comprising a reinforcing fiber overwrapped by a plurality of matrix-forming fibers, extending longitudinally therethrough.

2. The preform of claim 1 wherein the matrix-forming fibers each comprise a group of multiple matrix-forming fibers.

3. The preform of claim 1 wherein the matrix-forming fibers are continuous glass fibers.

4. The preform of claim 3 wherein the matrix-forming fibers each comprise high softening temperature silica fibers and lower softening temperature glass fibers.

5. The preform of claim 1 wherein the matrix-forming fibers are continuous metal fibers.

* * * * *